United States Patent [19]

Fuminier

[11] 4,386,544
[45] Jun. 7, 1983

[54] DEVICE FOR ROTATABLY GRIPPING A CYLINDRICAL PIECE

[75] Inventor: Claude Fuminier, Pont-a-Mousson, France

[73] Assignee: Pont-A-Mousson S.A., Nancy, France

[21] Appl. No.: 228,531

[22] Filed: Jan. 26, 1981

[30] Foreign Application Priority Data

Feb. 6, 1980 [FR] France .................... 80 02557

[51] Int. Cl.³ .................................. B23B 31/04
[52] U.S. Cl. ............................. 82/101; 82/40 R; 82/46; 279/2 R; 279/4
[58] Field of Search ............ 82/89, 83, 101, 86, 82/46, 28 R, 48, 30, 40 R; 279/1 ME, 1 R, 4, 1 Q, 48, 57, 69, 47, 1 H, 2 R; 10/87, 89, 89 WH, 90, 107 PH, 107 R

[56] References Cited

U.S. PATENT DOCUMENTS

| | | | |
|---|---|---|---|
| 1,577,015 | 3/1926 | Glaze | 279/48 |
| 1,807,385 | 5/1931 | Church | 279/1 H |
| 1,986,494 | 1/1935 | Battaline | 279/1 H |
| 2,174,292 | 9/1939 | Rich | 82/28 R |
| 2,687,197 | 8/1954 | Leifer | 82/28 R |
| 2,960,203 | 11/1960 | Sylla | 279/1 R |
| 3,270,592 | 9/1966 | Behnke | 82/40 R |
| 3,602,521 | 8/1971 | Uhtenwoldt | 279/1 Q |
| 3,933,061 | 1/1976 | Link | 82/30 |

Primary Examiner—Leonidas Vlachos
Assistant Examiner—Jerry Kearns
Attorney, Agent, or Firm—Sughrue, Mion, Zinn, Macpeak and Seas

[57] ABSTRACT

A sleeve grip for a pipe is radially expandable by axial compression from a bolt-nut system. One of the elements 8 of the bolt-nut system 13 is connected to a bidirectional drive motor 23 inducing rotation in the cylindrical pipe 2 and the other element 24 to the movable disc 25 of a brake 14. Thus, by simple tightening or slackening of the brake 14 and activation of the motor 23 inducing rotation in the pipe, it may be held by the expandable sleeve grip 12 or released.

15 Claims, 5 Drawing Figures

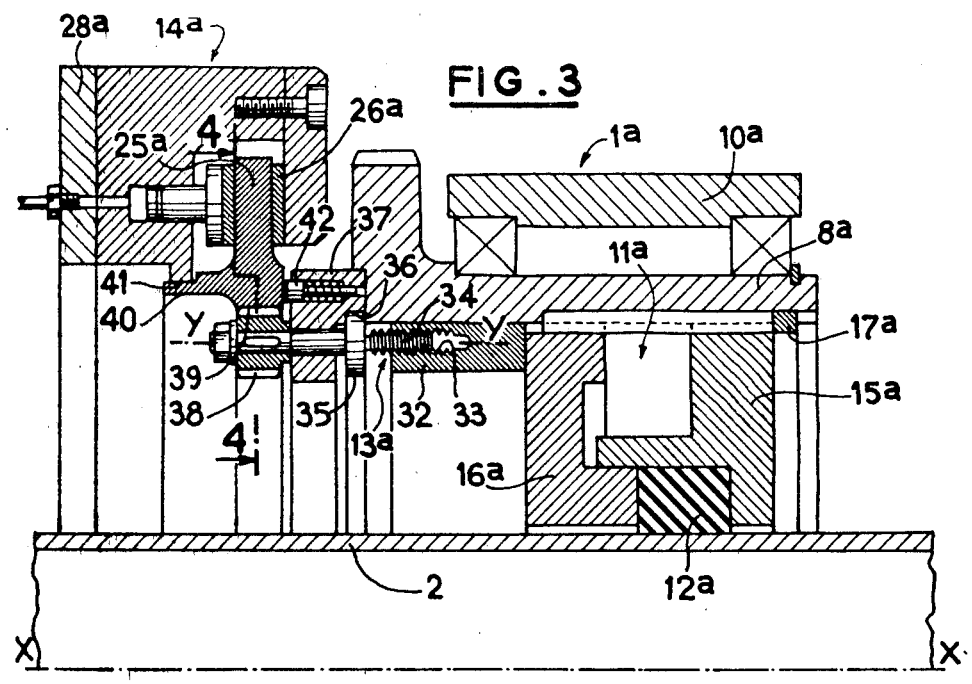
FIG. 3
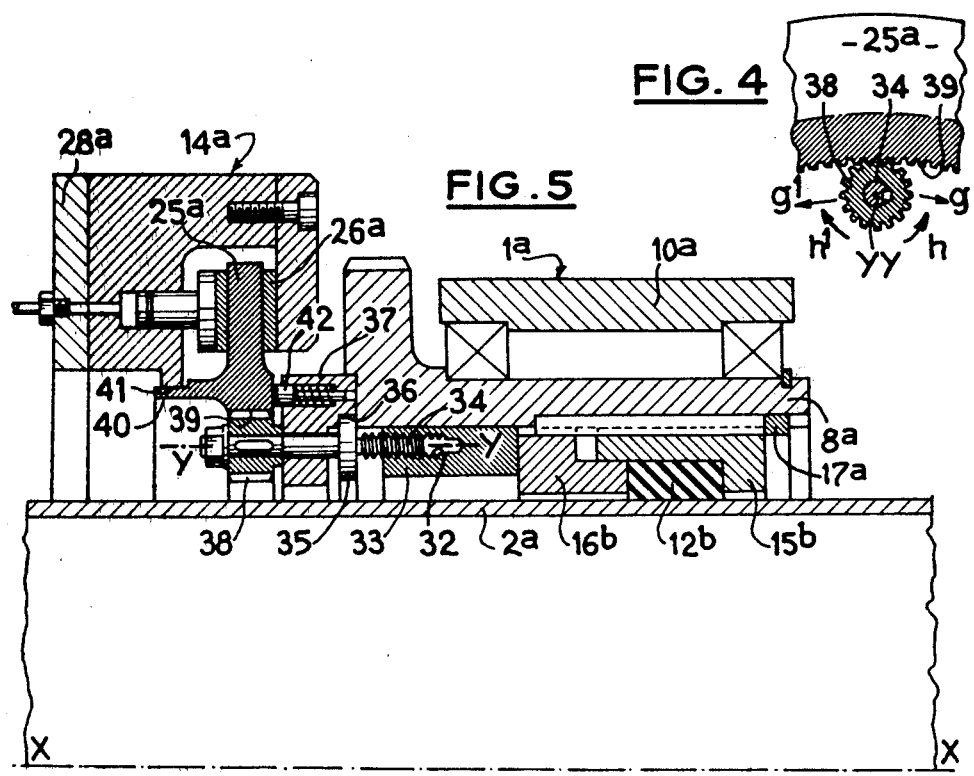
FIG. 4
FIG. 5

DEVICE FOR ROTATABLY GRIPPING A CYLINDRICAL PIECE

BACKGROUND OF THE INVENTION

The present invention relates to a device for inducing rotation in a cylindrical piece. It is particularly applicable to machine tools such as lathes.

There are known devices of this type in which the grip on the piece to be driven is obtained by a sleeve which is radially expandable by axial compression from a bolt-nut system.

SUMMARY OF THE INVENTION

The purpose of the invention is to provide a drive mechanism entailing simple means for activating the bolt-nut system which is well adapted to a high speed, repetitive industrial usage.

To this end, the invention provides a device for inducing rotation of a cylindrical piece of the type with a sleeve which is expandable radially by axial compression by means of a bolt-nut system, wherein one of the elements of the system is connected with the rotation drive motor for the cylindrical piece and the other to the movable part of a brake. Thus, by simple tightening or slackening of the brake and activation of the rotation drive motor for the cylindrical piece, it may be gripped by the expandable sleeve or released.

According to a first embodiment, the bolt-nut system is made up of a single nut and single bolt both of which coaxially surround the cylindrical piece.

In another embodiment, the female part of the bolt-nut system is made up of a sliding ring which has a series of holes tapped parallel to the axis of the tubular piece and arranged around that axis, while the male part of said bolt-nut system is made up of a series of axially immovable screws which interface with said holes, on each of which is attached a pinion. The set of pinions mesh with a toothed crown integral with the movable disc of the brake.

BRIEF DESCRIPTION OF THE DRAWINGS

FIGS. 3 and 5 are half-view longitudinal cross sections, with a scale larger than that of FIG. 1, of a drive device in conformity with a second embodiment of the invention; and FIG. 4 is a partial cross section taken along line 4—4 of FIG. 3.

DETAILED DESCRIPTION OF THE PREFERRED EMBODIMENTS

Figure 1:
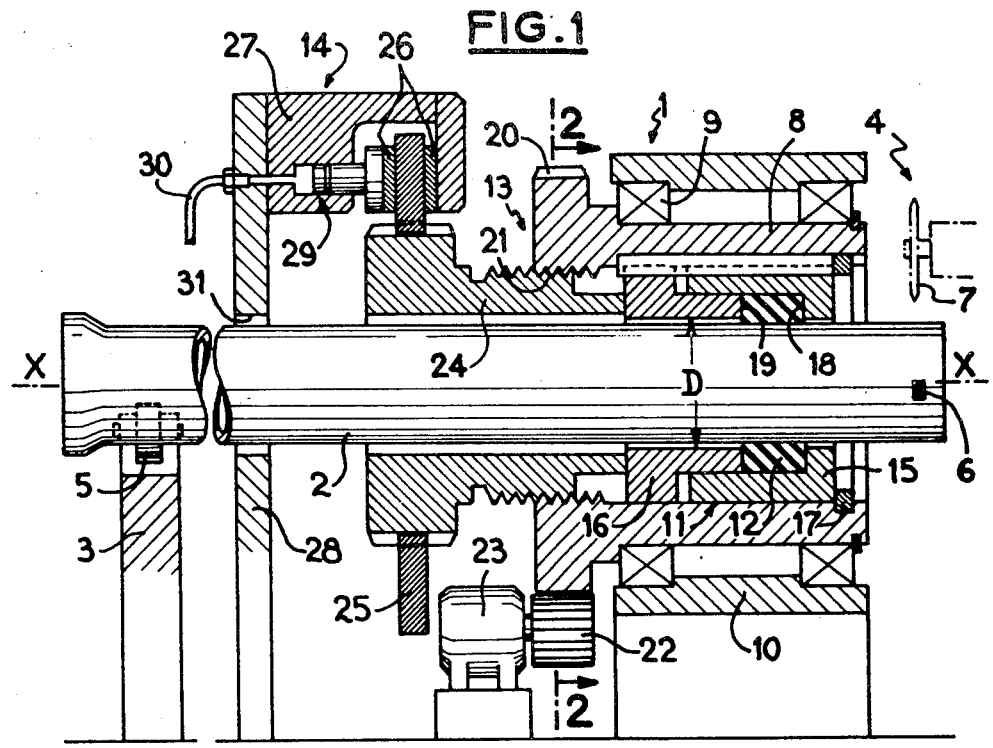
FIG. 1 is a schematic, longitudinal cross section view of a machine for sectioning metallic pipes equipped with a drive device according to a first embodiment of the invention.
Figure 2:
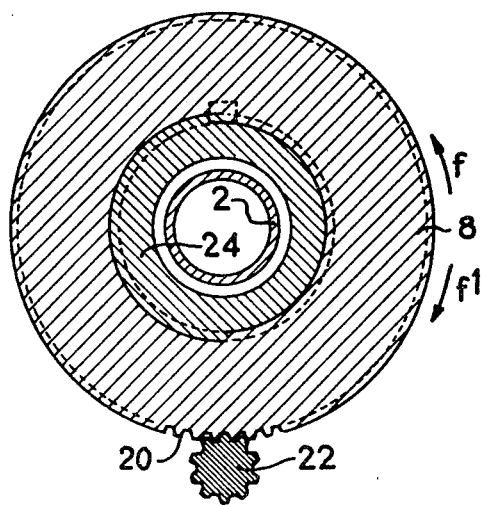
FIG. 2 is a cross section schematic view along line 2—2 of FIG. 1.

The sectioning machine represented in FIGS. 1 and 2 consists of a device 1 for inducing rotation in a pipe 2 with horizontal axis X—X interposed between a support 3 and a sectioning device 4. The support 3 is a frame provided with two loose rollers 5 with axes parallel to axis X—X. The sectioning device 4 may include a cutting tool 6 which moves radially or, as a variant and as represented by dots and dashes in FIG. 1, a grinding disk 7 with pendular motion.

The drive device 1 includes a hollow pin 8 mounted by roller bearings 9 and thrust blocks in a frame 10, a press fitting 11 provided with a small elastomer sleeve 12 which constitutes an annular grip, a bolt-nut system 13, and a brake 14.

The press fitting 11 is made up of two pieces 15, 16 which are wedged and capable of sliding inside the hollow pin 8. The piece 15 closest to the sectioning device 4 abuts a retaining ring 17 which fits into a groove inside the pin 8. Pieces 15 and 16 have cross sections resembling two Ls which dovetail telescopically with one another and identical inside diameters D slightly greater than the outside diameter of the pipe 2 to be grasped. They define two radial shoulders 18 and 19 opposite one another which axially delimit a ring-shaped chamber of variable length, open toward the X—X axis, in which the small sleeve 12 is housed. The latter, with a rectangular cross section, has the same outside diameter as the annular chamber and, in the resting position, scarcely emerges from that chamber.

The end of the pin 8 opposite the sectioning device 4 has a toothed exterior 20 and inside threading 21. The teeth 20 mesh with a pinion 22 mounted on the output shaft of a motor or motor reduction group 23 which rotates in two directions and at two speeds, and a sleeve 24 threaded on the outside, constituting a bolt-pushrod, is screwed inside the threading 21 and abuts the piece 16 of the press fitting 11.

On the outside end of the sleeve 24 is wedged, in a sliding manner, a brake disk 25 which passes between two brake fittings or shoes 26. One shoe 26 is borne on one branch of a fixed yoke 27 secured to a frame 28 and the other is supported by the piston of a jack 29 provided in the other branch of said yoke and fed with fluid under pressure through a conduit 30. Several brake units 26-29-30 may be arranged about the axis X—X.

The frame 28 has an opening 31 with axis X—X whose diameter is at least equal to the inside diameter of the sleeve 24, itself at least equal to the diameter D of pieces 15 and 16.

In operation, with the motor 23 in the stopped mode and the bolt-nut system 13 loosened, a pipe 2 is put in place on the supporting rollers 5 and inserted through the opening 31 in the frame 28 and through the pin 8 and the tubular grip 12. The grip is relaxed and the brake 14 is slackened.

To induce rotation of the pipe 2 the brake 14 is clamped (26 on 25), which prevents rotation of the sleeve or screw-pushrod 24, and the motor 23 is caused to rotate at a slow speed so that the pin 8 turns in direction f (FIG. 2), which should be the direction of rotation of the pipe 2 for its sectioning. The direction of the threading 21 is such that it ensures tightening of the grip 12 for this direction of rotation of the pin. It is thus righthand threaded in the case illustrated in FIG. 2.

The screw-pushrod 24 then moves like a screw in relation to the pin 8, which constitutes a nut. This results in a longitudinal displacement of said screw-pushrod 24 with respect to the pin 8 in the direction toward the grip 12, and consequently in the direction bringing the two pieces 15, 16 of the press fitting 11 together. The grip 12 is thus compressed axially and, as it is made of a volumetrically noncompressible material, dilates radially and proceeds to grip the pipe 2, which is then made solid with the pin 8. Note that the displacement of the screw-pushrod 24 is made possible by the sliding wedging of the brake disk 25, which remains fixed in motion.

Of course the brake 14 is clamped for only a brief moment, until the pipe 2 turns at the same speed as the pin 8 and is gripped sufficiently to be sectioned, so as to limit the displacement of the screw-pushrod 24. Then the brake is released by relaxing the pressure on the jack(s) 29, so that the shoes 26 move away from the disk 25, and the motor 23 shifts to a high speed without changing direction. After release of the brake, the screw-pushrod 24 no longer moves axially but continues to be driven in rotation by the pin 8 without any movement in relation to the latter, keeping its position pressing on the grip 12 through the press fitting 11.

During the entire sectioning operation, the brake remains slackened. When sectioning is complete, the motor 23 is stopped. When the pipe 2 stops, the pin 8 and the screw-pushrod 24 effect no rotary movement with respect to one another, so the grip 12 remains tight.

To relax the grip 12 and release the pipe 2 which has just been sectioned, the motor 23 is caused to turn at slow speed in the opposite direction, i.e., in this example, in the direction of arrow $f^1$ for the pin 8 (FIG. 2). The pipe 2 is then caused to rotate in the direction of the arrow $f^1$ by the grip 12 which is still tight. Then the brake 14 is clamped briefly, which produces a relative movement axially of the screw-pushrod 24 with respect to the pin-nut 8, as said screw-pushrod 24 is immobilized by the disk 25 while the pin 8 is caused to rotate in the direction of arrow $f^1$. The screw-pushrod 24 is unscrewed from inside the pin-nut 8 and allows the press fitting 11 to release the elastic annular grip 12, which pushes the piece 16 back because of the elasticity of the grip 12 and returns the grip 12 to its initial shape while releasing the pipe 2. After this release of the pipe 2, the motor 23 is stopped and the sectioned pipe 2 is removed or advanced forward to be sectioned again in the event tubular rings are being cut.

In a variant, the disk 25 could be attached to the sleeve 24 and the yoke 27 could slide axially along the frame 28. Moreover, other types of brakes could be used instead of the disk brake 14.

The rotation drive device 1 is usable for an entire range of different diameters of pipe 2 to be sectioned. If one desires to change the diameter of pipe, e.g., to grip and induce rotation in a pipe 2 of smaller diameter, there are only three pieces to change: the annular elastic grip 12 and the two pieces 15-16 of the press fitting 11. Reconversion within the limits imposed by the diameter of the sleeve 24 and of the opening 31 in the frame 28 is thus simple and easy.

The device $1^a$ in FIGS. 3 and 4 shares the key parts of the device 1, which shall be designated by the same reference numbers followed by the superscript $a$. In the hollow pin $8^a$, which rotates in the frame $10^a$, the two pieces $15^a$, $16^a$ of the press fitting $11^a$ are wedged in a sliding manner, with piece $15^a$ abutting a ring $17^a$. The sleeve grip $12^a$ is retained between these two pieces $15^a$ and $16^a$.

The device $1^a$ differs from the device 1 with respect to the following items which concern the bolt-nut system $13^a$.

The pushrod element of the press fitting is a ring 32 which slides inside the pin $8^a$ and has a series of tapped holes 33 with axes Y—Y parallel to axis X—X and around the periphery of its outside end surface. Each of these holes interfaces with a screw 34 provided with a small collar 35. The latter is maintained in rotation but fixed in axial movement between the end surface of the pin $8^a$ and a groove 36 of a retention ring 37 attached to the pin $8a$ by screws (not shown). The end of each screw 34 passes through a hole in the ring 37 and a pinion 38 is attached to its end.

All the pinions 38 mesh with a toothed crown 39 provided on the inside periphery of a brake disk $25^a$ which is part of the brake $14^a$, itself designed in the same manner as the brake 14 of FIG. 1. The disk $25^a$ has an annular protuberance or hub 40 which is slidably guided by a centering portal 41 secured to the frame $28^a$ of the brake.

Axial spring-loaded studs 42 distributed around the periphery of the ring 37 have, at their free ends, a friction lining which presses against the disk $25^a$.

In the operation of the device $1^a$, generally analogous to that of the device 1, when the pipe 2 to be sectioned must be held by the grip $12^a$, the brake disk $25^a$ is pinched by the friction linings $26^a$ and the pin $8^a$ is caused to rotate at low speed. The gripping of the disk $25^a$ causes it to be immobilized, while the screws 34, which rotate with the pin $8^a$ due to the ring 37, are driven around the axis X—X. This results in the screw heads 38 in the shape of pinions rolling around the toothed internal crown 39 of the immobilized disk $25^a$. This causes the screws 34 to unscrew from their tapped holes 32 and consequently brings about the axial displacement of the ring 33, which pushes the piece $16^a$ of the press fitting $11^a$ toward the grip $12^a$ to compress it axially. There is therefore a gripping of the pipe 2, as above. When the pipe 2 is turning at the same speed as the pin $8^a$ with the desired amount of grip, the brake $14^a$ is released; the brake disk $25^a$, as it is no longer blocked, is driven by the pinions 38 and begins to turn about the axis X—X at the same speed. The screws 34 no longer turn around their own axes Y—Y, so that the ring 33 and the piece $16^a$ of the press fitting undergo no further axial displacement.

By way of example, if the screws 34 have a righthand thread, the rotary movements during tightening take place in the direction of arrows g, h in FIG. 4.

With respect to releasing the sectioned pipe 2, first the rotation of the pin $8^a$ is halted by stopping the motor. Then the motor is caused to turn in the opposite direction at low speed, and thus the pin $8^a$ caused to move in direction $g^1$ opposite the previous direction g, and the brake $14^a$ is applied for as much time as necessary to disconnect the pipe 2 and the grip $12^a$. The disk $25^a$ having been immobilized while the pin $8^a$, the ring 32 and the screws 34 turn about the axis X—X in direction $g^1$, the screw heads 38 roll on the toothed crown 39 in the direction $h^1$ opposite to direction h. These screws 34, prevented from axial movement by their collars 35, then screw into the holes 32 tapped into the ring 33, which brings about the axial displacement of the latter in the direction away from the grip $12^a$. The grip is thus decompressed and freed axially and reverts to its initial shape. When the pipe is freed, the motor is stopped so that the pin $8^a$ and the pipe 2 may be withdrawn and removed, or advanced, as the case may be, for an additional sectioning.

The friction studs 42 serve, after release of the brake $14^a$, to free the disk $25^a$ from the fixed base $26^a$ so as to avoid any friction harmful to the arrangement, and also to ensure slight friction between the disk $25^a$ and the rotating ring 37 so as to avoid any sudden release of the pipe 2 during the operation of the machine stemming from inertia.

FIG. 3 illustrates the gripping pieces 15$^a$, 16$^a$, 12$^a$ for a small diameter pipe 2. FIG. 5 shows the same device provided instead with gripping pieces 15$_b$, 16$_b$, 12$_b$ for a larger diameter pipe 2$^a$. As in the example of FIGS. 1 and 2, it can be seen that only these three pieces need to be changed to adapt the device to pipes of different diameters.

If devices 1 and 1$^a$ are compared, it will be noted that the advantage of device 1 is in its simplicity; on the other hand, because of the importance of the contact friction between the bolt 24 and the nut 8, attributable to the large diameter of the threading 21, it is difficult to control the gripping force exerted on the small sleeve 12. The device 1 of FIG. 1 is therefore not fully satisfactory except for small machines handling small-diameter tubular pieces or cylinders, where the torque from friction is slight when compared with the torque from the grip.

For the large diameters, for the reasons just indicated, it is preferable to use device 1$^a$, in which the large single bolt 24 is replaced by a series of small diameter screws 34. For a given real gripping effort, the friction torque for the device 1a is much less than for the device 1 since the friction torque is proportional to the diameter of the screws 34 in FIG. 2 and is proportional to the diameter of the bolt 24 in FIG. 1. The friction torque then in FIG. 2 is slight in relation to the grip torque and the value of the grip is very well controlled.

What is claimed is:

1. A device (1, 1a) for gripping and rotating a cylindrical piece (2, 2a), comprising:
   a radially expandable sleeve grip (12, 12a), said sleeve grip gripping said cylindrical piece when in a radially expanded state;
   a bolt-nut system (13, 13a) for radially expanding said sleeve grip so as to grip said cylindrical piece, said bolt-nut system including first (8, 8a and 33) and second (24, 34) threadably engaged elements;
   a motor (23);
   means (20, 22) for interconnecting said motor and said first element for rotating said first element;
   a brake (14, 14a) having a movable part (25, 25a) interconnected with said second element;
   whereby braking said movable part while said first element is being rotated in a predetermined direction causes axial displacement of one of said first and second elements which radially expands said sleeve grip.

2. The device as claimed in claim 1 wherein said brake comprises two non-rotatable brake shoes (26, 26a) disposed on opposite sides of said brake movable part which comprises a disc, said brake also including means for pressing said brake shoes against said disc to brake rotation of said disc.

3. The device as claimed in claim 1 wherein said bolt-nut system further includes first (15, 15a) and second (16, 16a) pieces disposed on opposite sides of said sleeve grip and around said cylindrical piece, means (17, 17a) for limiting axial movement of said first piece, one (24, 33) of said first and second elements being engageable with said second piece for axially moving said second piece towards said first piece.

4. The device as claimed in claim 3 wherein said limiting means comprises a retaining ring (17, 17a) which is disposed in a groove inside a hollow pin (8, 8a) which is part of said bolt-nut system.

5. The device as claimed in claim 3 wherein said first and second pieces have L-shaped cross sections, an inside diameter of said first and second pieces being substantially equal to one another and being slightly greater than an outside diameter of said cylindrical piece.

6. The device as claimed in claim 3 wherein said first and second pieces define two radial shoulders (18, 19) which define a chamber whose length varies as said second piece is moved towards said first piece by said one of said first and second elements, said sleeve grip being disposed within said chamber.

7. The device as claimed in claim 2, further comprising a fixed yoke (27) for supporting said non-rotatable brake shoes, said disc being slidably wedged on said second element of said bolt-nut system.

8. The device as claimed in claim 1 wherein said first element comprises a single nut (8) and said second element comprises a single bolt (24), said nut and bolt both coaxially surrounding said cylindrical piece.

9. The device as claimed in claim 8 wherein said nut has inside threading (21), said bolt having outside threading which engages said inside threading of said nut, said bolt being movable axially as said brake movable part is braked which radially expands said sleeve grip.

10. The device as claimed in claim 1, wherein said bolt-nut system comprises:
    a sliding ring (32) having a series of tapered holes (33), said holes being aligned parallel to an axis (X—X) of said cylindrical piece, said holes being distributed around said axis;
    a series of screws (34) threadably engaged in said holes;
    means (36, 37, 8a) for preventing axial movement of said plurality of screws;
    a plurality of pinions (38) attached to said plurality of screws, said pinions being engaged with said brake movable part.

11. The device as claimed in claim 10 wherein said brake includes two non-rotatable brake shoes (26a) which are disposed on opposite sides of said brake movable part, said brake further including means for pressing said brake shoes against said brake movable part to brake rotation of said brake movable part, said brake movable part having a tooth crown (39) which engages said pinions, whereby braking rotation of said brake movable part causes said pinions to rotate which causes said sliding ring to slide in an axial direction and radially expand said sleeve grip.

12. The device as claimed in claim 10 wherein said axial movement preventing means includes friction elements (32) which are elastically pressed against said brake movable part.

13. The device as claimed in claim 1 wherein said sleeve grip comprises a small elastomer sleeve.

14. The device as claimed in claim 1 wherein said motor is bi-directional.

15. The device as claimed in claim 1 wherein said motor is bi-directional and has two speeds in each direction.

* * * * *